(12) United States Patent
Bhardwaj

(10) Patent No.: US 6,965,606 B2
(45) Date of Patent: Nov. 15, 2005

(54) METHOD AND APPARATUS FOR BYTE ROTATION

(75) Inventor: Sanjay Bhardwaj, Fremont, CA (US)

(73) Assignee: Exar Corporation, Fremont, CA (US)

( * ) Notice: Subject to any disclaimer, the term of this patent is extended or adjusted under 35 U.S.C. 154(b) by 854 days.

(21) Appl. No.: 09/771,172

(22) Filed: Jan. 26, 2001

(65) Prior Publication Data

US 2003/0221082 A1 Nov. 27, 2003

(51) Int. Cl.⁷ .............................. G01R 31/08
(52) U.S. Cl. ....................... 370/428; 710/65
(58) Field of Search .................. 710/67–70, 65, 710/66, 68, 316, 26, 3; 370/412, 413, 414, 416, 417, 418, 419, 420, 428, 429, 401

(56) References Cited

U.S. PATENT DOCUMENTS

| | | | |
|---|---|---|---|
| 4,407,016 A | * | 9/1983 | Bayliss et al. ................. 710/3 |
| 5,404,166 A | * | 4/1995 | Gillard et al. ........... 348/390.1 |
| 5,410,677 A | | 4/1995 | Roskowski et al. |
| 5,517,627 A | | 5/1996 | Petersen |
| 5,550,987 A | * | 8/1996 | Tanaka ........................ 710/106 |
| 5,638,367 A | * | 6/1997 | Gaytan et al. ............... 370/471 |
| 5,721,841 A | | 2/1998 | Szczepanek |
| 5,787,094 A | | 7/1998 | Cecchi et al. |
| 5,922,066 A | | 7/1999 | Cho et al. |
| 5,983,305 A | | 11/1999 | Szczepanek |
| 6,122,281 A | | 9/2000 | Donovan et al. |
| 6,130,894 A | | 10/2000 | Ojard et al. |
| 6,208,772 B1 | * | 3/2001 | Wilt et al. ................... 382/308 |

FOREIGN PATENT DOCUMENTS

| | | |
|---|---|---|
| CA | 2360951 | 8/2000 |
| EP | 0502544 | 9/1992 |
| EP | 0597349 | 5/1994 |
| EP | 0752800 | 1/1997 |

OTHER PUBLICATIONS

English language abstract of EP0597349 published May 18, 1994.

"Method and Apparatus for Data Alignment", U.S. Appl. No. 09/771,173, filed on Jan. 26, 2001.

* cited by examiner

Primary Examiner—Bob Phunkulh
Assistant Examiner—Ian N. Moore
(74) Attorney, Agent, or Firm—Townsend and Townsend and Crew LLP

(57) ABSTRACT

A scheme is described for distributing data operations on an irregular data stream over multiple stages of a data aligner to generate a regular data stream having continuous filled byte positions. In one particular embodiment, data alignment may involve the prediction of a rotation amount for unaligned data bytes. The rotation amount is predicted one clock cycle before actual rotation of data bytes based on the current contents of a buffer. The one cycle look ahead enables a large portion of calculations to be performed in a previous clock cycle and, thereby, may facilitate a high frequency design for a data aligner.

14 Claims, 11 Drawing Sheets

| Serial Number | Shift Amount Value | Value of the Mux Control signal mxcntl[15:0] |
|---|---|---|
| 1 | 4'b0000 | 16'b0000000000000000 |
| 2 | 4'b0001 | 16'b1000000000000000 |
| 3 | 4'b0010 | 16'b1100000000000000 |
| 4 | 4'b0011 | 16'b1110000000000000 |
| 5 | 4'b0100 | 16'b1111000000000000 |
| 6 | 4'b0101 | 16'b1111100000000000 |
| 7 | 4'b0110 | 16'b1111110000000000 |
| 8 | 4'b0111 | 16'b1111111000000000 |
| 9 | 4'b1000 | 16'b1111111100000000 |
| 10 | 4'b1001 | 16'b1111111110000000 |
| 11 | 4'b1010 | 16'b1111111111000000 |
| 12 | 4'b1011 | 16'b1111111111100000 |
| 13 | 4'b1100 | 16'b1111111111110000 |
| 14 | 4'b1101 | 16'b1111111111111000 |
| 15 | 4'b1110 | 16'b1111111111111100 |
| 16 | 4'b1111 | 16'b1111111111111110 |

FIGURE 10

| Rotate_Amount | Input | Output |
|---|---|---|
| 0 | {ABCDEFGHIJKLMNOP} | {ABCDEFGHIJKLMNOP} |
| 1 | {ABCDEFGHIJKLMNOP} | {PABCDEFGHIJKLMNO} |
| 2 | {ABCDEFGHIJKLMNOP} | {OPABCDEFGHIJKLMN} |
| 3 | {ABCDEFGHIJKLMNOP} | {NOPABCDEFGHIJKLM} |
| 4 | {ABCDEFGHIJKLMNOP} | {MNOPABCDEFGHIJKL} |
| 5 | {ABCDEFGHIJKLMNOP} | {LMNOPABCDEFGHIJK} |
| 6 | {ABCDEFGHIJKLMNOP} | {KLMNOPABCDEFGHIJ} |
| 7 | {ABCDEFGHIJKLMNOP} | {JKLMNOPABCDEFGHI} |
| 8 | {ABCDEFGHIJKLMNOP} | {IJKLMNOPABCDEFGH} |
| 9 | {ABCDEFGHIJKLMNOP} | {HIJKLMNOPABCDEFG} |
| 10 | {ABCDEFGHIJKLMNOP} | {GHIJKLMNOPABCDEF} |
| 11 | {ABCDEFGHIJKLMNOP} | {FGHIJKLMNOPABCDE} |
| 12 | {ABCDEFGHIJKLMNOP} | {EFGHIJKLMNOPABCD} |
| 13 | {ABCDEFGHIJKLMNOP} | {DEFGHIJKLMNOPABC} |
| 14 | {ABCDEFGHIJKLMNOP} | {CDEFGHIJKLMNOPAB} |
| 15 | {ABCDEFGHIJKLMNOP} | {BCDEFGHIJKLMNOPA} |

FIGURE 17

METHOD AND APPARATUS FOR BYTE ROTATION

FIELD OF THE INVENTION

This invention relates to the field of network systems and, more specifically, to data aligners used in network systems.

BACKGROUND

The Internet may be described in a simplified manner as a collection of computer systems that are interconnected by networks (e.g., transmission lines, switches and routers) to enable the transfer of data among the computer systems. Data is typically transmitted in networks along a data path in the form of data packets. An important characteristic of a data path is bit width. Bit width is the number of bits manipulated or passed contemporaneously on the data path. The bit width of a data path determines its bandwidth along with clock speed. Bandwidth is a measure of how fast data flows on the data path. In digital systems, bandwidth may be expressed as data speed in bits per second (bps).

At one time data was exclusively carried on a traditional Plain-Old Telephone System (POTS), or Public Switched Telephone Network (PSTN), using copper wire transmission lines that have limited bandwidth capability. Later, other types of networks were developed using higher bandwidth transmission lines that enabled greater amounts of data to be transmitted over a given time (higher bps), for example, an Integrated Services Digital Network (ISDN). ISDN provides digital transmission over ordinary PSTN copper wires on a narrow band local loop.

Higher bandwidths are the need of the time given the explosive growth and doubling of data traffic over the Internet. Two solutions for meeting the need for increased bandwidths are higher clock speeds and wider data paths. System designers are capitalizing on technology advancements by running the data path at higher clock speeds. System designers are also increasing the bit width to make data paths wider. Despite wider data paths, these systems still may be required to support legacy systems, i.e., older systems designed earlier on narrower data paths. Thus, the use of wider data paths may lead to data stream irregularities.

Other important parameters associated with a data path are the type of network and protocol used to transmit data on the data path. Computer systems communicate with each other using a variety of networks such an Internet Protocol (IP) network and a Synchronous Optical Network (SONET). SONET is the United States standard for synchronous data transmission on optical media. The international equivalent of SONET is synchronous digital hierarchy (SDH). Together, they ensure standards so that digital networks can interconnect internationally and that existing conventional transmission systems can take advantage of optical media.

Computer systems use network protocol related circuitry, such as network adapters, to encode and decode the data that is transmitted on a network for error detection and correction purposes. Selective byte removal and addition is commonplace in various protocol implementations and inter-networking specifications. These two factors lead to the generation of arbitrary data streams, from a hitherto regular data stream, which have to be gathered and aligned for efficiency and ease of manipulation. The generation of regular data streams allows for efficient use of line bandwidth for faster data transmit times. In addition, regular data streams are easier to manipulate, more conducive to pipelining, and easier to fetch and store. These factors are accorded high importance in network circuits and systems since they impact the key differentiating parameters for customers and the marketplace.

One type of circuit that operates to map arbitrary data streams to a regular data stream is known as a data aligner. More specifically, a data aligner takes unaligned data in various byte sizes and aligns the data to achieve a packed byte size. One problem with some prior data aligners is that they contain an extensive amount of logic in the first of multiple stages of a design in order to deal with as many unaligned data scenarios as possible. Another problem with some prior data aligners is that they feedback the output of an output selection multiplexer to an intermediate buffer, thereby leading to congestion of logic in the first stage of a design. This is because such a solution, when it realizes that there is not enough data in certain packets to pass on as output, may tend to hold concatenated data in the intermediate buffer rather than run and restore the data. Such approaches may not only be difficult to design but may also result in higher processing times in the data aligner's first stage, thereby, limiting the frequency at which such data aligners may operate.

SUMMARY OF THE INVENTION

The present invention pertains to a method and apparatus for byte rotation. In one particular embodiment, the method may include receiving a plurality of bytes in a first buffer having a size with a number of the plurality of bytes containing data. The method may also include determining a state of the plurality of bytes by a controller at least one clock cycle before a rotation of the plurality of bytes and predicting a rotation amount for the rotation of the plurality of bytes in a rotator based on the state.

In another particular embodiment, the method may include predicting a first number of bytes residing in a first buffer in a succeeding clock cycle. The method may also include performing a calculation of a rotation amount of a second number of bytes received from a second buffer based on the prediction, with the calculation performed in a current clock cycle.

In one particular embodiment, the apparatus may include a first buffer coupled to receive a clock signal have a plurality of clock cycles, a controller, a rotator coupled to the controller and the first buffer. The rotator may include a first rotation circuit coupled to receive an input and generate a first output. The rotator may also include a first multiplexer coupled to receive the input and the first output of the rotation circuit. The first multiplexer selects between the input and the first output based on a first rotate amount control signal receive from the controller. The first rotate amount control signal may be determined by predicting a number of bytes residing in the first buffer in a succeeding clock cycle.

Additional features and advantages of the present invention will be apparent from the accompanying drawings and from the detailed description that follows.

BRIEF DESCRIPTION OF THE DRAWINGS

The present invention is illustrated by way of example, and not by way of limitation, in the figures of the accompanying drawings and in which:

FIG. 10 illustrates one embodiment of a relationship between a rotated amount and a value of a multiplexer control vector.

FIG. 11 is an exemplary embodiment illustrating outputs of a rotator based on inputs and rotate amounts.

DETAILED DESCRIPTION

In the following description, numerous specific details are set forth such as examples of specific components, devices, methods, etc., in order to provide a thorough understanding of the present invention. It will be apparent, however, to one skilled in the art that these specific details need not be employed to practice the present invention. In other instances, well-known materials or methods have not been described in detail in order to avoid unnecessarily obscuring the present invention.

A scheme is described for distributing data operations on an irregular data stream over multiple stages of a data aligner to generate a regular data stream having contiguously filled bytes. Distribution of data operations may allow for the data aligner to operate at higher frequencies by utilizing later stage circuitry for some data operations in order to free-up first stage circuitry for receipt of additional data bytes.

In one particular embodiment, the number of unaligned data scenarios may be reduced through the use of data stream element mapping. A complex data stream may be mapped onto a simple data stream with only the addition of multiplexers and combination logic gates to the control outputs of the data aligner.

It should be noted that while the scheme is described in relation to 16 byte data elements, the scheme is also applicable for other data element byte sizes, such as, 32 bytes, 8 bytes, and 4 bytes. In an alternative embodiment, the scheme described herein may be implemented with a variable data width where the data width is a configurable parameter. It should also be noted that the "lines" discussed herein that connect components may be either single bit lines, multiple bit lines, or buses.

Figure 1:
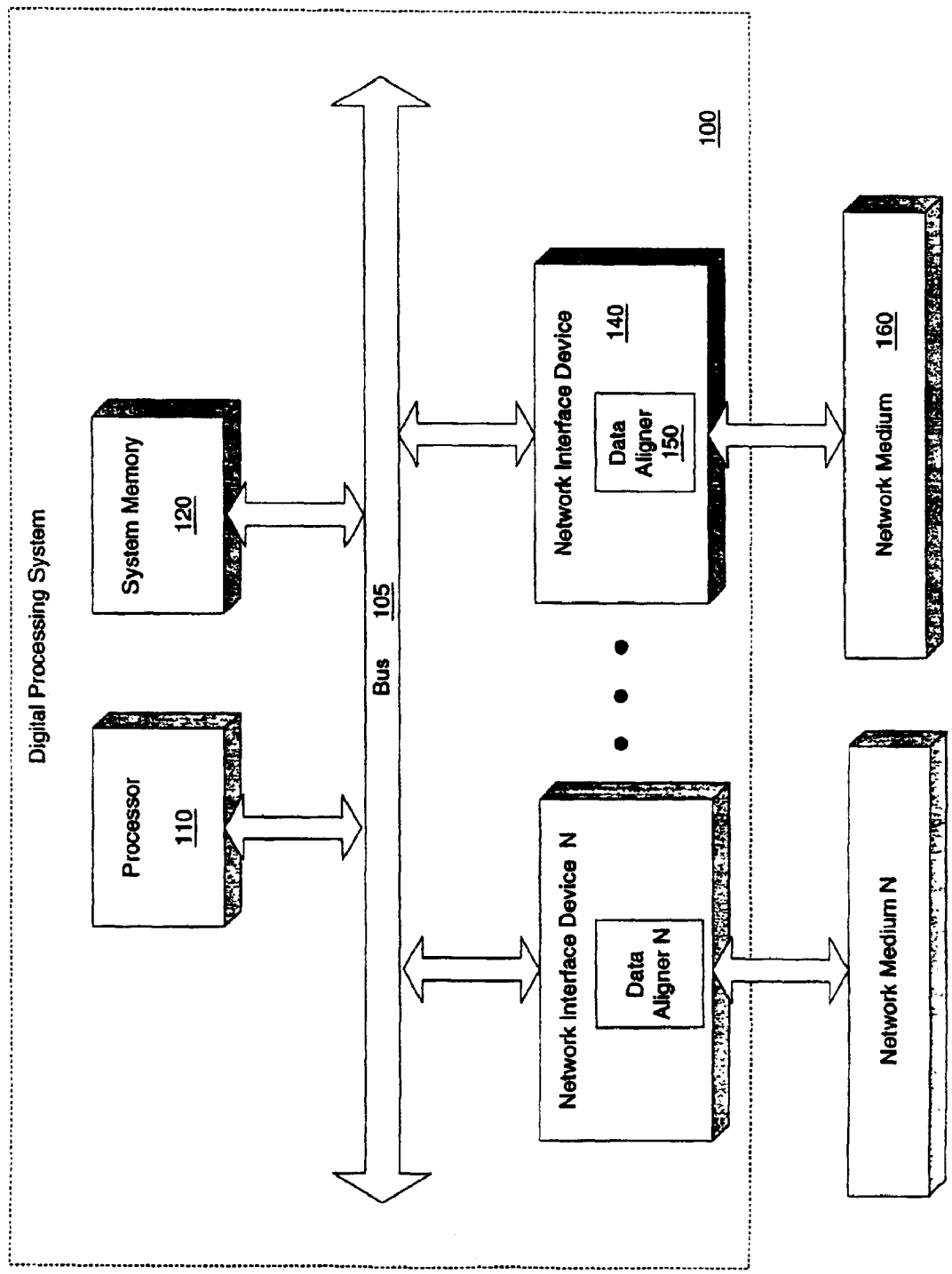
FIG. 1 illustrates a digital processing system including one embodiment of a data aligner.

FIG. 1 illustrates one embodiment of a digital processing system 100 representing, for examples, a workstation, personal computer, server, etc., in which a data aligner 150 may be implemented. Digital processing system 100 includes a bus or other communication means 105 for communicating information, and a processing means such as processor 110 coupled with bus 105 for processing information and controlling the movement of data packets to and from network interface device 140. Processor 110 may represent one or more processors such as a general purpose processor (e.g., a Motorola PowerPC processor or an Intel Pentium processor), a special purpose processor (e.g., a digital signal processor (DSP)), and a controller.

Digital processing system 100 further includes system memory 120 that may include a random access memory (RAM), or other dynamic storage device, coupled to bus 105 for storing information (e.g., packets) and instructions to be executed by processor 110. System memory 120 also may be used for storing temporary variables or other intermediate information during execution of instructions by processor 110. System memory 120 may also include a read only memory (ROM) and/or other static storage device coupled to bus 120 for storing static information and instructions for processor 110.

One or more network interface devices (network interface device 140 to network interface device N) may be coupled to bus 105. In an alternative embodiment, network interface device 140 may reside external to digital processing system 100. Network interface device 140 includes network protocol related circuitry to encode and decode the data that is transmitted on network 160 for error detection and correction purposes. In one embodiment, network interface device 140 includes circuitry for the generation of regular data streams. Network interface device 140 includes data aligner 150. Data aligner 150 operates to map arbitrary data streams to a regular data stream, as discussed in detail below.

Depending upon the particular design environment implementation, the network interface device 140 may be a SONET card, an Ethernet card, token ring card, or other types of interfaces for providing a communication link to network 160. SONET and Ethernet are known in the art; accordingly, a detailed discussion is not provided.

It will be appreciated that the digital processing system 100 represents only one example of a system, which may have many different configurations and architectures, and which may be employed with the present invention. For example, some systems often have multiple buses, such as a peripheral bus, a dedicated cache bus, etc. As another example, digital processing system 100 may also include a controller (not shown) coupled to bus 105 to assist processor 110 in the movement of data packets to and from network interface device 140. In an alternative embodiment, digital processing system may be an intermediate node (e.g., a switch or a router) in a network that provides a network to network interface. Such an intermediate node may provide an interface between similar networks or different networks. For example, network medium 160 may be a fiber optic medium and network medium N may be a transmission line medium.

Figure 2:
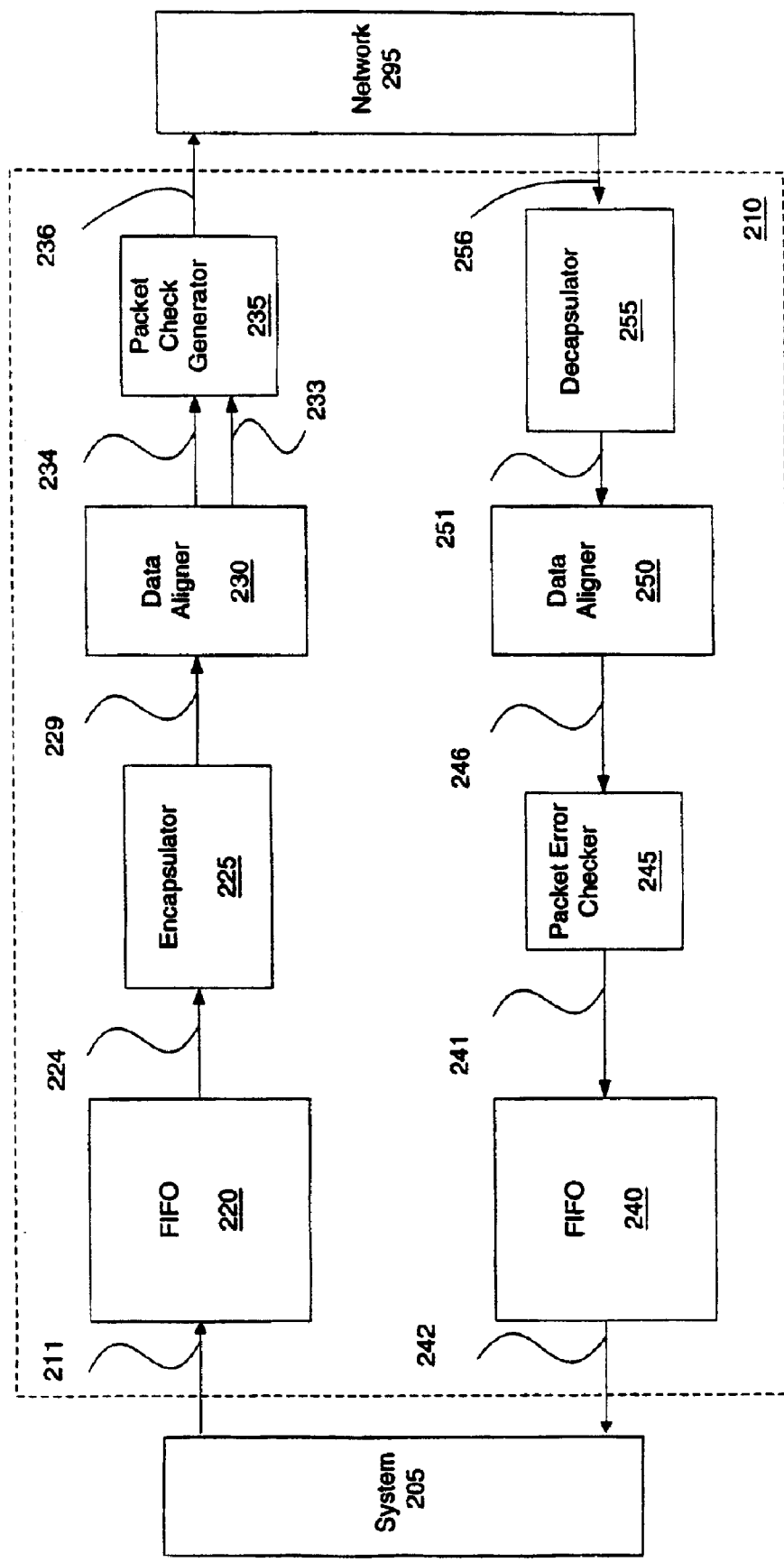
FIG. 2 illustrates a network interface device including one embodiment of a data aligner.

FIG. 2 illustrates one embodiment of an network interface device including a data aligner. Network Interface device 210 may be network interface device 140 of FIG. 1. Data, in the form of packets, is transmitted along a data path from a system 205 to a network 295 through interface device 210. The data path is the structural portion of the network interface device which, under the influence of control, manipulates and passes data from a one side (e.g., on line 211) to the other side (e.g., on line 236). Network interface device 210 formats the data into a packet protocol structure that is conducive to transmission on network 295. The packet protocol specifies the arrangement of information within the packet. In one embodiment, for example, system 205 may be a client or a server, and network 295 may be a SONET or Ethernet as mentioned above.

Packets are transmitted in an egress direction from system 205 through network interface device 210 to network 295. Packets are received in an ingress direction from network 295 through network interface device 210 to system 205. In one embodiment, network interface device 210 may include first-in-first-out (FIFO) memories 220 and 240, data aligners 230 and 250, packet check generator 235, packet error checker 245, encapsulator 225 and decapsulator 255.

Packets are received by FIFO 220 from system 205 on line 211. Packets arriving faster than the throughput capacity of network interface device 210 may result in a dropped transmission. FIFO 220 operates to buffer the data stream received from system side 205 in order to handle overloads of packets in the data stream. Similarly, FIFO 240 operates to buffer the data stream received from network 295. In alternative embodiments, buffering may be accomplished by other means, for example, using a memory (e.g., RAM, FIFO) coupled to network interface device 210 or a memory residing in system 205 (e.g., system memory 120 of FIG. 1).

Packets are transmitted from FIFO 220 to encapsulator 225 on line 224. Encapsulator 225 frames a packet according to a framing specification. The framing specification is a specification of the "protocol bits" that surround the "data bits" to allow the data to be "framed" into segments. The framing specification allows a receiver to synchronize at points along the data stream.

The data stream packets are output from encapsulator 225 on line 229 to data aligner 230. Data aligner 230 operates to gather bytes in the received packets that may arrive arbitrarily in time. Data aligner 230 receives unaligned data in various byte sizes and aligns the data to achieve a packed bytes. Data aligner 230 outputs aligned data packets on line 234 to packet check generator 235. The byte elements within a packet that are output to packet error checker may not always contain valid data due to the packing operation. As such, data aligner 230 also transmits a control signal on line 233 to packet check generator 235 that indicates which bytes in the packet are valid. Data aligner 230 may also transmit other control signals to packet check generator 235, such as SOP and EOP control signal. The operation of data aligner 230 is discussed in detail below.

In one embodiment, a packet check generator 235 is used to verify the accuracy of the data stream. The packet check generator 235 generates an output in addition to the data stream that may be used by a packet error checker of a receiving system (e.g., packet error checker 245) to determine whether a packet is good or whether errors are present in the data stream. The data stream is transmitted to network 295 on line 236. Some packets such as Ethernet packets, for example, have a 32 bit cyclic redundancy check. In one embodiment, an error detecting code such as 32 bit cyclic redundancy check (CRC) may be appended at the end of the packet to provide automatic error detection functionality. It should be noted, however, that the 32 bit CRC data may be located anywhere in the packet. Error detecting code such as CRC code is a number derived from a block of data in order to detect corruption. In an alternative embodiment, error detection codes and methods other than CRC may be used.

Using packet error checking, a receiver system (not shown) coupled to network 295 can detect transmission errors by recalculating a check code from the data packet and comparing it to a check value originally transmitted. It should be noted that packet check generator 235 need not be placed at the end of the transmit stage but may be placed at any location along the data stream path.

Packets received from network 295 are input to decapsulator 255 on line 256. Decapsulator 255 removes the framing data from data stream packets. When framing data is remove from the data stream, the data stream may become irregular (i.e., non-continuous). This data stream is input to data aligner 250 on line 251. Data aligner 250 operates to gather non-continuous bytes in the received data stream and pack, or align, bytes in the packets to achieve a continuous data stream.

The output of data aligner 250 is provided to packet error checker 245 on line 246. Packet error checker 245 may be used to verify the accuracy of the data stream. The packet error checker 245 generates a code using the received data stream and compares the generated code with a received code embedded in the data stream to determine whether a packet is good or whether errors are present in the data stream. The output of packet error checker 245 may be passed to FIFO 240 on line 241. FIFO 240 operates to buffer the data stream output to system 205 on line 242.

A FIFO, packet error checker, encapsulator, and decapsulator are known in the art; accordingly, a detailed discussion of their operation is not provided. It should be noted that the interface device 210 has been shown with separate components merely to illustrate the operations on data flowing in both an ingress and egress direction. In an alternative embodiment, the components of network interface device 210 may be combined into one or more integrated circuits.

Figure 3:
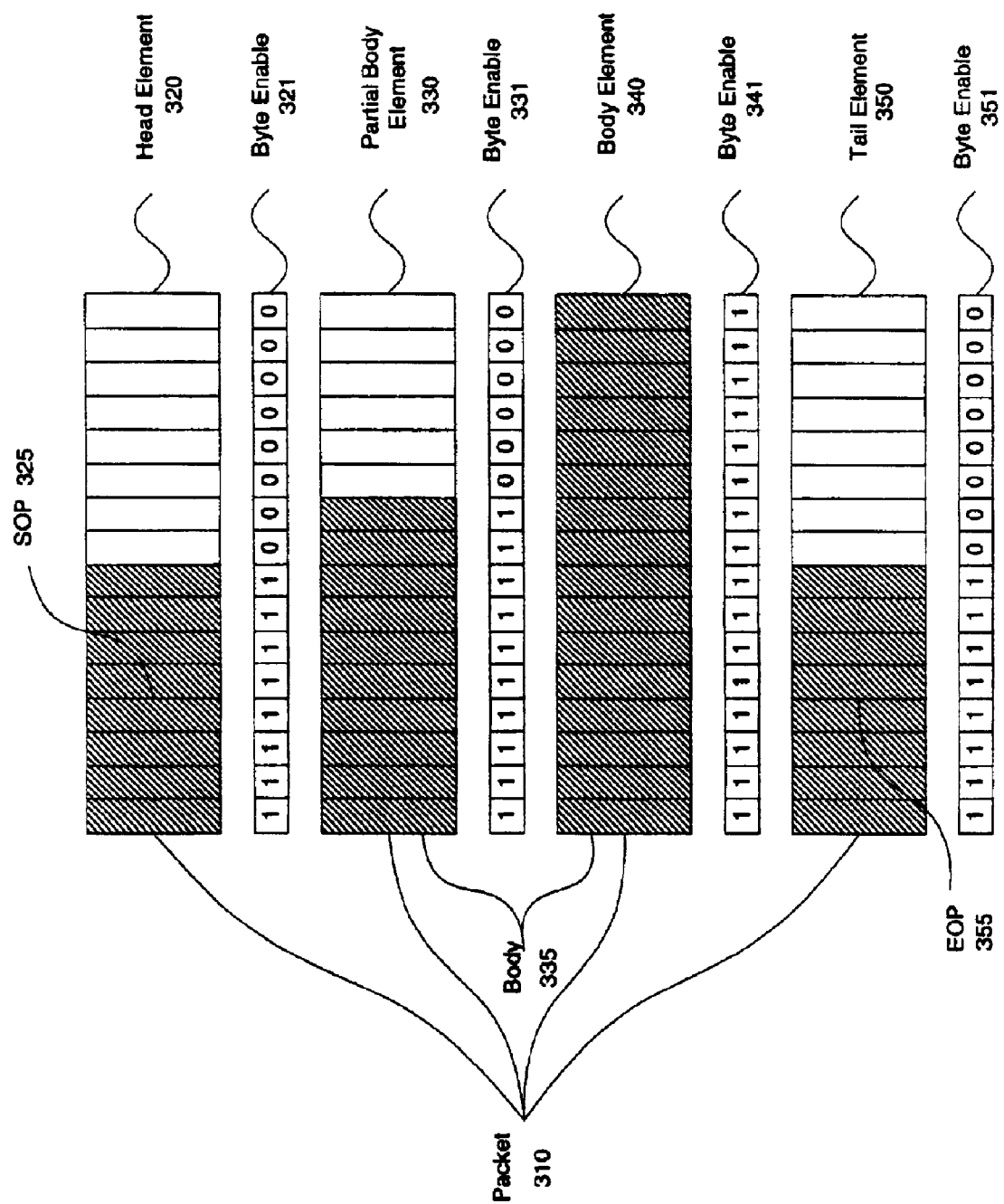
FIG. 3 illustrates one embodiment of a packet structure and corresponding exemplary byte enables.

FIG. 3 illustrates one embodiment of a packet structure and corresponding exemplary byte enables. A packet 310 may include one or more elements 320, 330, 340, and 350. Each packet element may have one or more bytes, for example, 16 bytes. Although the following discussion uses a 16 byte packet element size as an example, other packet element byte sizes may be used, for examples, 32 bytes, 8 bytes, and 4 bytes.

Packet 310 includes a single head element 320, a single tail element 350, and a body 335 that may includes one or more body elements (e.g., elements 330 and 340). A head element 320 signifies the start of a packet and its byte positions may be either partially or fully filled with data bits. Head 320 may be determined by the assertion of a start of packet (SOP) control signal 325 that either partially or fully fills the bytes of head element 320 with data bits.

A tail element 350 signifies the end of a packet and its byte positions may be either partially or fully filled with data bits. Tail element 350 may be determined by the assertion of an end of packet (EOP) control signal 355 that may either partially or fully fill the bytes of tail element 350 with data bits. A body element has all of its byte positions filled with data bits (e.g., body element 340). A partial body refers to a body element (e.g., element 330) that is partially filled with data bits which is neither a head element 320 or a tail element 350. A hole is an empty element either within packet 310 or between packet 310 and another packet (not shown).

FIG. 3 also illustrates exemplary byte enables 321, 331, 341, and 351 that may correspond to the packet elements. A byte enable of "1" indicates that data is present in the corresponding byte position. A byte enable of "0" indicates that data is absent from the corresponding byte position. The byte enables are sent to the control portion of buffers, as discussed below in relation to FIGS. 4 and 7.

Figure 4:
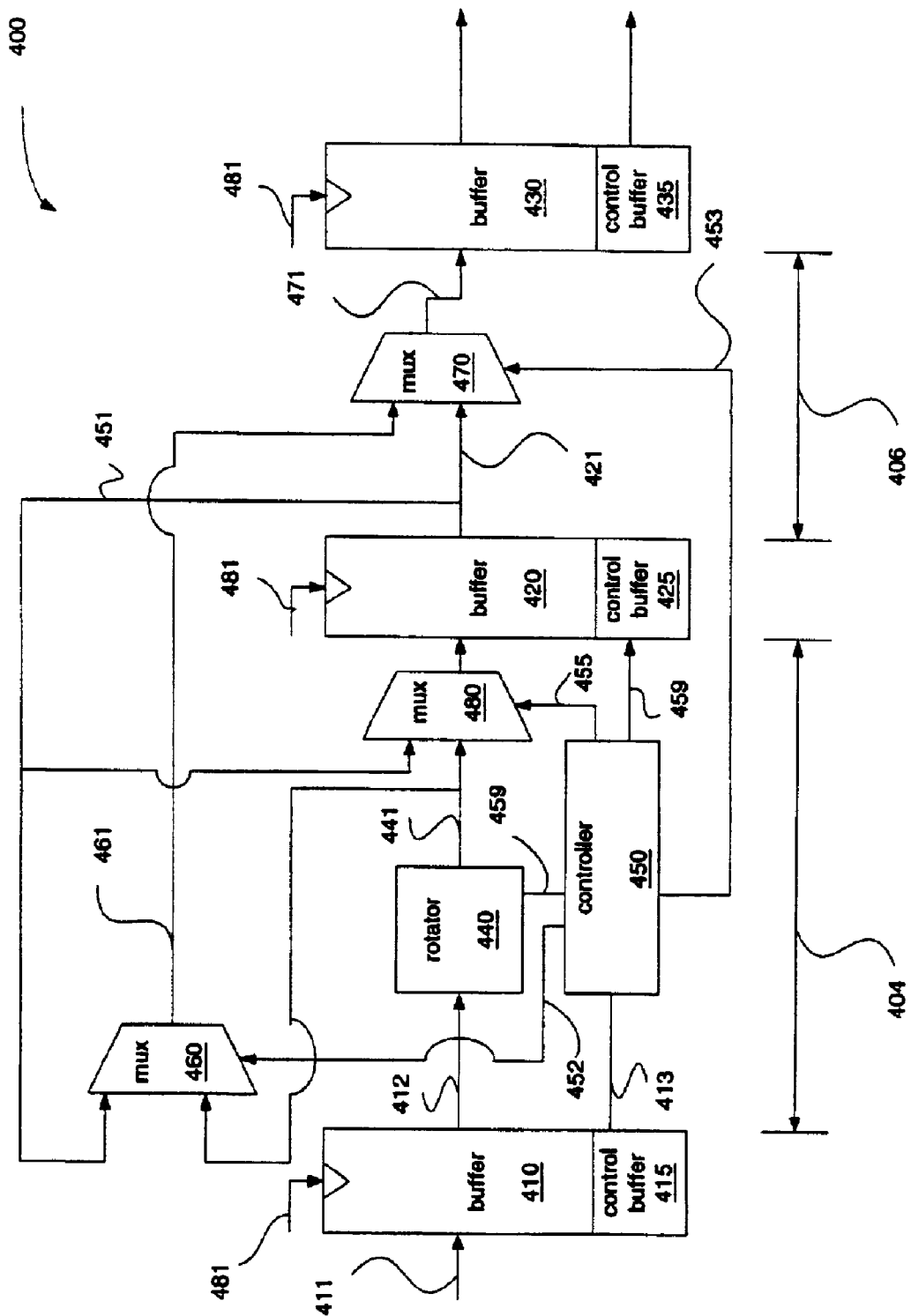
FIG. 4 illustrates one embodiment of a data aligner.

FIG. 4 illustrates one embodiment of a data aligner. In one embodiment, data aligner 400 includes a two stage (stages 404 and 406) pipeline separated by an intermediate buffer 420. Intermediate buffer 420 operates to store all unpassed data between stages 404 and 406. Data aligner 400 also includes buffers 410 and 430 coupled to the input of stage 404 and the output of stage 406, respectively. In one embodiment, buffers 410, 420, and 430 may be registers. Buffers 410, 420, and 430 operate to store data received from a previous stage. Data aligner 400 may also include control buffers 415, 425, and 435 that operate to store byte enables for packet elements, as discussed below. Buffers and registers are known in the art; accordingly, a detailed description is not provided.

In one embodiment, for example, buffers 410, 420, and 430 may have a size of 16 bytes. In an alternative embodiment, buffers 410, 420, and 430 may have other sizes depending on the particular byte scheme used by a system, for examples, 32 bytes, 8 bytes, and 4 bytes.

Buffers 410, 420, and 430 each have a clock input coupled to receive a clock signal via line 481. The clock signal may be recovered from the data signal or, alternatively, may be generated by a clock generator (not shown). The clock signal contains multiple clock cycles on which the timing of operations in data aligner 400 may be performed.

Buffer 410 has an input coupled to receive data packets on line 411. Buffer 410 outputs the data packets to rotator 440 and controller 450 on lines 412 and 413, respectively. The output of rotator 440 is coupled to intermediate buffer 420 and multiplexer 460 via line 441. The output of intermediate buffer 420 is coupled to a data input of multiplexer 470 on line 421. The output of multiplexer 470 is coupled to buffer 430 via line 471.

Controller 450 may be used to control the operation of multiplexers 460 and 470 to pass on byte data; to control the operation of rotator 440; to generate external control signals such as SOP, EOP; and to generate byte enable control signals (as illustrated in FIG. 3). Controller 450 also has control outputs coupled to rotator 440 and a control input of multiplexer 460 on lines 452 and 459, respectively, and to a control input of multiplexer 470 on line 453.

Rotator 440 operates to rotate one or more bytes into different byte slots, or positions, of an element under the control of controller 450. In one embodiment, a rotate amount control signal may be applied to rotator 440 on line 452 by controller 450. The output of rotator 440 is applied as input data to buffer 420 through multiplexer 480, and also as an input to multiplexer 460. The function of the rotate amount control signal is to determine the amount by which contents of buffer 410 are rotated so that the remainder, if any, of buffer 410 and the remainder, if any, of buffer 420 are concatenated and the contents of buffer 420 are properly byte aligned. For the determination of the rotate amount, various bytes states may be recognized by controller 450 one clock cycle before the actual rotation occurs.

In a first byte state, the content of buffer 410 is written to buffer 420 in a pass through manner. No byte lanes are crossed such that byte 0 of buffer 410 goes to byte 0 of buffer 420; byte 1 of buffer 410 goes to byte 1 of buffer 420; etc. This byte state occurs when controller 450 determines that either buffer 420 is empty or contains an EOP signal where the packet level granularity is required to be maintained. This byte state may also occur when, irrespective of the state of buffer 420, buffer 410 contains an SOP signal. As such, there is no dependency between buffer 410 and buffer 420. In either case, no data bytes require alignment and byte data is written in a pass through manner. The rotation amount for the next cycle may be predicted to be 16 minus the number of bytes in buffer 410.

In a second byte state, the entire 16 bytes of buffer 410 are written to buffer 420, implying that buffer 420 is full in the next cycle. The rotate amount in this case may be predicted to be zero, again implying no byte lane crossing.

In a third byte state, no byte from buffer 410 is written to buffer 420. Such a state represents the case where buffer 410 contains an EOP signal and the state of buffers 410 and 420 are such that the data may be directly passed between buffers 410 and 420 to buffer 430, precluding a need for shifting for the subsequent data input to buffer 410. The rotate amount in this case may be predicted to be zero.

In a fourth byte state, the net valid byte count in buffer 410 and buffer 420 exceeds 16 and a remainder of the content in buffer 410 is written into buffer 420 with proper byte lane crossings. For this case a prediction is made for a subsequent input to buffer 410. The rotate amount for this case may be predicted to be 32 minus the net number of bytes in buffer 410 and the number of bytes in buffer 420.

As an example, buffer 420 may have 14 bytes as valid (containing data) and buffer 410 may have 6 bytes as valid. In the following clock cycle, 16 bytes will be passed to buffer 430, while four remaining bytes are stored in buffer 420. The rotate amount is thus 32−20=12 for the next set of input. For a vector of {15, 14, 13, 12, 11, 10, 9, 8, 7, 6, 5, 4, 3, 2, 1, 0}, a rotate amount of 12 results in a vector {11, 10, 9, 8, 7, 6, 5, 4, 3, 2, 1, 0, 15, 14, 13, 12} thereby ensuring that a subsequent input starts from position 4 onwards accounting for 4 byte leftover. The one clock cycle look ahead enables the performance of calculation in a previous clock cycle.

Multiplexers 460, 470, 480 are used to select between two of their data inputs based on the value of a control signal applied to their control input. Multiplexers are known in the art; accordingly, a detailed discussion is not provided herein. The output of multiplexer 460 is coupled to a data input of multiplexer 470 on line 461. The output of multiplexer 470 is coupled to buffer 430 on line 471. The output of mulitplexer 480 is coupled to buffer 420. Multiplexers 460, 470, and 480 receive control signals on control inputs from controller 450 on lines 452, 453, and 455, respectively. It should be noted that the multiplexers have been illustrated separate from other components for the purposes of discussion. The multiplexers may reside within other component blocks, for example, mulitplexer 480 may reside within buffer 420.

The function of the control signals that are applied to multiplexers 460 and 470 is to select the multiplexer's output form the contents of buffer 420 and the rotated contents of buffer 410. In one embodiment, the applied control signal may be a 16 bit control signal that is a function of the rotator amount, involving a one 16 byte spanning operation, as illustrated in FIG. 10. A "1" at a position implies that the rotated output of rotator 440 is selected, while a "0" at a position implies that the output of buffer 420 is selected. The value of the rotate amount signifies the number of "1"s in the multiplexer control signal vector starting from position 0.

Controller 450 also has a control output coupled to buffer 420 via line 459. In one embodiment, the control signal output to buffer 420 via line 459 may be 16 bits wide and controls the writing byte by byte of buffer 420 after contents for the buffer are chosen based on the rotate amount signal discussed above. The control signal output to buffer 420 may also determine the valid bytes in buffer 420 in a next clock cycle. For the determination of the buffer 420 write enable, various states may be recognized by controller 450 during a current clock cycle.

In one case, the content of buffer 410 may be written to buffer 420 in a pass through manner. This case occurs when buffer 420 is empty or contains an EOP signal where the packet granularity is required to be maintained. This case may also occur when, irrespective of the state of buffer 420, buffer 410 contains a SOP signal. In such a situation, the byte enables corresponding to buffer 410 become the write enables to buffer 420.

In a second case, the entire 16 bytes of buffer 410 may be written to buffer 420, implying a full buffer 420 in the next clock cycle. In such a situation, the write enables to buffer 420 are all "1"s.

In a third case, no byte from buffer 410 is written to buffer 420. Buffer 410 contains an EOP signal and the state of buffer 410 and 420 is such that the data may be directly passed to buffer 430, precluding a need for shifting for the subsequent input. In such a situation, the write enables to buffer 420 are all "0"s.

In a fourth case, the net valid byte count in buffer 410 and buffer 420 exceeds 16 and a remainder of the content in buffer 410 is written to buffer 420 with proper byte lane crossings. In this situation, the write enables to buffer 420 are calculated as the number of valid bytes in buffer 410 plus the number of valid bytes in buffer 420 minus 16.

The data aligner 400 discussed above may be used to receive unaligned data on line 411 in various byte sizes and align the data to achieve a particular byte size, as discussed below in relation to FIG. 5. Data aligner 400 may support data packets that have head elements, body elements, and tail elements.

Figure 5:
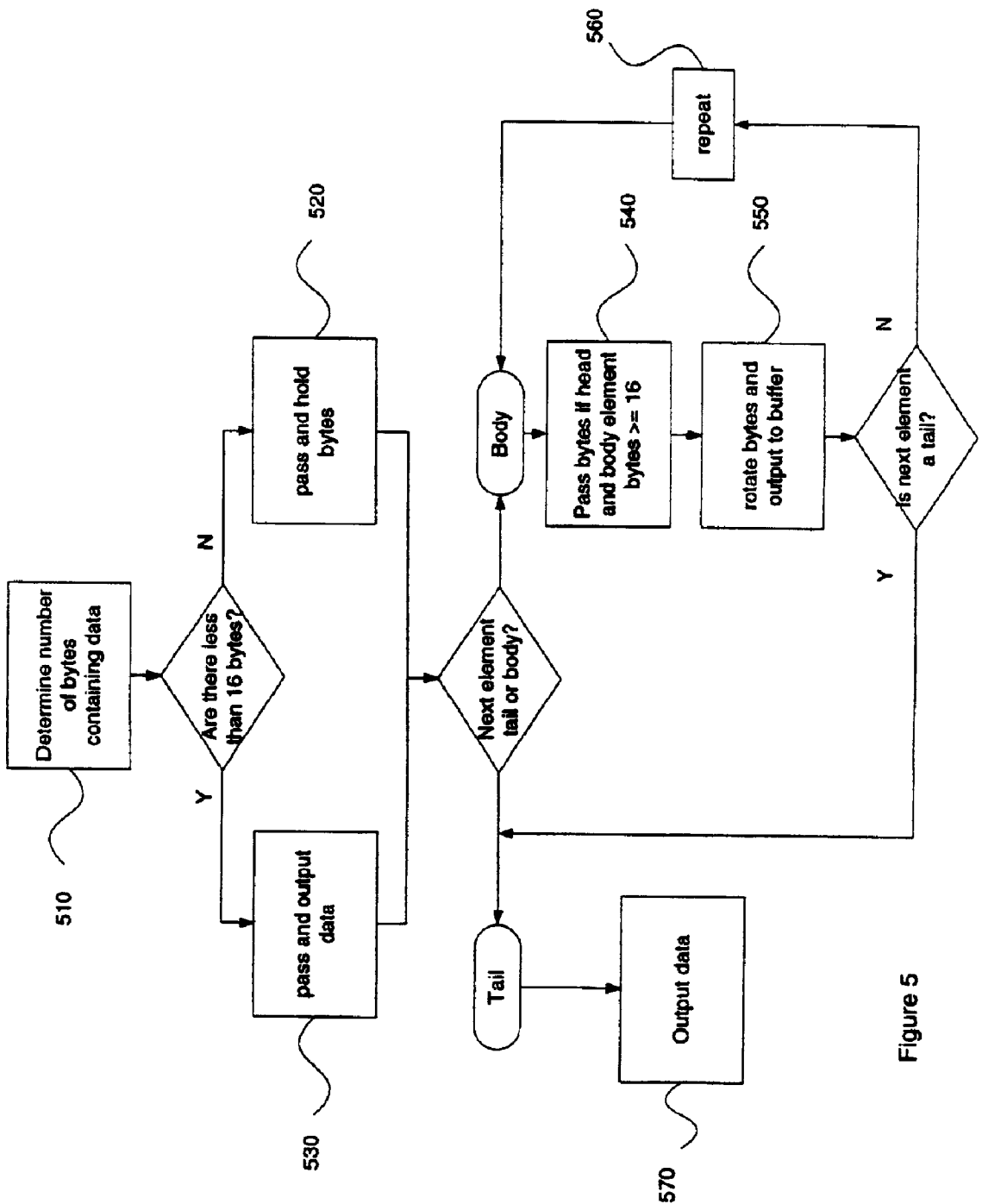
FIG. 5 illustrates one embodiment of a method of data alignment.

FIG. 5 illustrates one embodiment of a method of data alignment. The method is discussed herein in relation to a data scheme wherein the data elements have 16 bytes. Similar methods may be used with other byte packet schemes, as previously mentioned. In one embodiment, data aligner 400 may be initially empty of data. At the arrival of a head element of a data packet, controller 450 determines whether the head element contains less than 16 bytes of data, step 510. If the head element contains less than 16 bytes of data, then the bytes are passed to and held in buffer 420 for future packing, step 520. If the head element contains a full 16 bytes of data, the data is passed to buffer 430 to be outputted with control signals, step 530.

The head element may be followed by a body element or a tail element. If the head element is followed by a body element then, since the number of bytes of data in intermediate buffer 420 and the number of bytes in the following body element are greater than or equal to 16 bytes, all 16 bytes, after due processing, are passed to buffer 430 along with a control signal generated by controller 450 to indicate a SOP, step 540.

A determination is made to either select bytes from intermediate buffer 420 or newly input bytes into buffer 410 based on the number of bytes containing data in each. The newly inputted bytes in buffer 410 are rotated by the number of bytes previously passed directly from the buffer 410 to make up for a net of 16 bytes, step 550. The rotated bytes are written to intermediate buffer 420. Steps 540 to 550 are repeated until controller 450 determines that a tail is reached, step 560.

When a tail is reached, the data in buffer 430 is output on line 431 irrespective of the net packet size to maintain packet boundaries at each element, step 570. In this manner, the data aligner 400 converts a head element, body elements, and a tail element (of which the head and/or tail element may be partially filled) into a continuous packet having one or more body elements and one tail element.

As an example of the above method, a head element may be received in register 410 and determined by controller 450 to contain 7 bytes of data. Because the head element contained less than 16 bytes, the 7 bytes are passed to and stored in intermediate buffer 420. The next element received is a body element. The body element is determined by controller 450 to have 16 bytes of data and controller 450 calculates that a total of 23 bytes of data have been received. Because the total exceeds the 16 byte size of data aligner 400, controller 450 selects the lower 9 bytes of the 16 byte body element to output with the 7 bytes from the header element as a packed 16 byte body element. To do this controller 450 passes the selected 9 bytes of data through rotator 440 to be applied to an input of multiplexer 460. The 9 rotated bytes, along with 7 bytes from buffer 420, are applied as an input to multiplexer 470. Controller 450 sends a multiplexer control signal on line 453 to multiplexer 470 to output the 16 concatenated bytes from multiplexer 460, which are outputted.

Data aligner 400 now has 16 bytes in register 430, that are outputted, and 7 bytes remaining in register 410. Because the lower 9 bytes of the 16 byte body element were passed out, the remaining 7 bytes in register 410 are output from rotator 440 into the lower byte positions and written into register 420. The rotated bytes are then inputted and stored in intermediate buffer 420. When the next body element is received, the above steps are repeated to generate a packed 16 byte element to output to register 430.

When a tail element is received, as determined by controller 450 from receipt of an EOP signal, then the bytes of the tail element that contain data are combined with the bytes in intermediate buffer 420 and output to register 430 without waiting for the packed byte size to equal 16 bytes. For example, if there are 7 bytes stored in intermediate buffer 420 and a tail element is received that contains 1 byte of bit data, then controller 450 passes the 1 byte through rotator 440. Then the 7 bytes stored in intermediate buffer 420 and the 1 byte rotated output are fed into multiplexer 470 by controller 450 to be outputted in the next clock cycle.

The method described above in relation to FIG. 5 may handle relatively regular data streams having head, body, and tail elements in packets. In an alternative embodiment, other types of data streams (hereafter referred to as a complex data stream to distinguish from the simple data stream discussed in relation to FIGS. 4 and 5) may be encountered in network protocols where regularity may be impacted by arbitrary enabling and disabling of bytes, for example, a dry sequence in a standardized Packet Over SONET (POS) protocol. In one embodiment, a complex data stream may contain holes and partial body elements, as defined above in relation to FIG. 3. Such a complex data stream may be handled by mapping these elements to the elements of the simple data stream discussed in relation to FIGS. 4 and 5.

Figure 6:
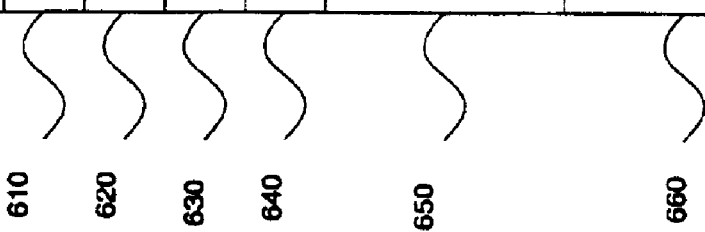
FIG. 6 illustrates one embodiment of a complex to simple data stream mapping scheme.

FIG. 6 illustrates one embodiment of a mapping scheme to handle hole and partial body elements in a data stream. In one embodiment, a head element of a complex data stream may be mapped 610 to a head element of a simple data stream; a body element of a complex data stream may be mapped 620 to a body element of a simple data stream; and a tail element of a complex data stream may be mapped 630 to a tail element of a simple data stream. A hole may be handled by holding states 640 and taking no action in a data aligner, such as data aligner 700 discussed below in relation to FIG. 7.

Figure 7:
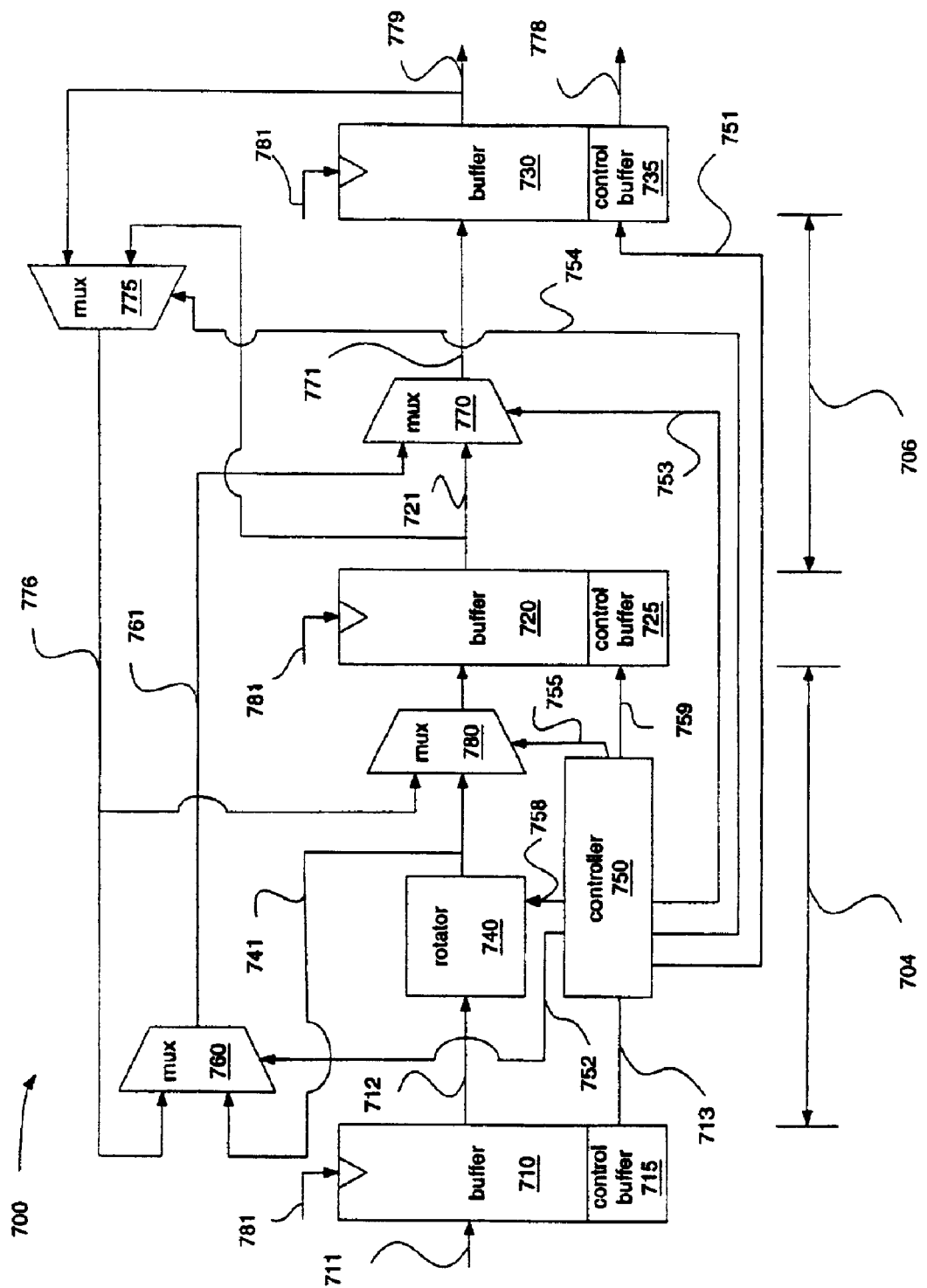
FIG. 7 illustrates an alternative embodiment for a data aligner.

Partial body functions may be mapped 650 and 660 to that of the tail of a simple data stream by categorizing the tail into two different tail elements: Tail A and Tail B. A Tail A element is one where the net count of bytes containing data bits in the partial body and the intermediate buffer 720 of data aligner 700 of FIG. 7 are less than 16. A Tail B element is one where the net count of bytes containing data bits in the partial body and intermediate buffer 720 of data aligner 700 of FIG. 7 is greater than or equal to 16.

FIG. 7 illustrates an alternative embodiment for a data aligner that may be implemented with a complex data stream. In one embodiment, data aligner 700 may include two pipelined stages (stages 704 and 706) separated by buffers 720 and 730. Data aligner 700 includes buffer 730, rotator 740, controller 750, and multiplexers 760, 770, 775, and 780. Rotator 740 and controller 750 may operate in a manner similar to rotator 440 and controller 450 of FIG. 4, unless otherwise specified.

Buffers 710, 720, and 730 each have a clock input coupled to receive a clock signal via line 781. The clock signal may be recovered from the data signal or, alternatively, may be generated by a clock generator (not shown). The clock signal contains multiple clock cycles on which the timing of operations in data aligner 700 may be performed.

Buffer 720 operates to store all unpassed data between stages 704 and 706. Data aligner 700 also includes buffers 710 and 730 coupled to the input of stage 704 and the output of stage 706, respectively. In one embodiment, buffers 710, 720, and 730 may be registers. Control buffers 715, 725, and 735 are coupled to controller 750 and operate to store byte enables.

Buffer 710 has an input coupled to receive data packets on line 711 and output the data packets to rotator 740 and controller 750 on lines 712 and 713, respectively. The output of rotator 750 is coupled to a data input of multiplexer 780 with the other data input of multiplexer 780 coupled to receive the output of multiplexer 775 on line 776. The output of rotator 740 is also coupled to a data input of multiplexer 760 with the other data input of multiplexer 760 coupled to receive the output of multiplexer 775 via line 776. The output of multiplexer 780 is coupled to the input of buffer 720.

Rotator 750 operates to rotate one or more bytes into different byte slots, or positions, of an element under the control of controller 750. In one embodiment, a rotate amount control signal may be applied to rotator 750 via line 758 by controller 750. The function of the rotate amount control signal is to determine the amount by which contents of buffer 710 are rotated so that the remainder, if any, of buffer 710 and the remainder, if any, of buffer 720 are concatenated and the contents of buffer 720 are properly byte aligned.

For the determination of the rotate amount, various bytes states may be recognized by controller 750 one clock cycle before the actual rotation occurs, as discussed above in relation to rotator 440 of FIG. 4. The clock cycle look ahead approach may be maintained while supporting a partial body element structure. In a complex data stream, the number of bytes in buffer 720 in a next clock cycle are predicted and replaced as the net valid count of the current calculation. In the current calculation, the net valid count is the number of bytes in buffer 710 plus the number of bytes in buffer 720. For the case of a partial body support and prediction of the rotate amount for the subsequent input, the current net valid byte calculation becomes the byte count of buffer 720. The rotate amount serves as the control and as a seed for other control signals.

Controller 750 has control outputs coupled to rotator 740 and control inputs of multiplexers 760, 770, 775, and 780 via line 752, 753, 754, and 755, respectively. Controller 750 also a control output coupled to rotator 740 via line 759 and a control output coupled to buffer 720 via line 759.

The output of multiplexer 760 is coupled to a data input of multiplexer 770 via line 761. The output of buffer 720 is coupled to the other data input of multiplexer 770 and to a data input of multiplexer 775, via line 721. The output of multiplexer 770 is coupled to buffer 730 on line 771. Buffer 730 includes a data output and a control output. The data output of buffer 730 is coupled to a data input of multiplexer 775 via line 779. The control output of buffer 730 is output on line 778.

Controller 750 also has control outputs coupled to buffer 720 via line 759 and buffer 730 via line 751. In one embodiment, the control signal output to buffers 720 and 730 via lines 759 and 751, respectively, may be 16 bits wide. The control signal to buffer 720 controls the writing of the buffer byte by byte after contents for the buffer are chosen based on the rotate amount signal. The control signal output to buffer 720 may also determine the valid bytes in buffer 720 in a next clock cycle. For the determination of the buffer 720 write enable, various states may be recognized by controller 750 during a current clock cycle, similar to those discussed above in relation to FIG. 4. The receipt of a hole may be handled by the retention of states.

The case where a partial body is received is explained with the following example. Assume a sequence of 6 bytes followed by 6 bytes followed by 8 bytes on start up of data aligner 700 within the same packet. The case where 8 bytes are in buffer 710 and 6 bytes are in buffer 720 and buffer 710 does not contain an EOP signal is not cover by the cases discussed above in relation to FIG. 4. In this situation, an attempt is made to pass all 14 bytes to buffer 730. In the next clock cycle, controller 750 determines that it is a partial body element case and restores the merged output of buffer 730 (control and data) to intermediate buffer 720 and the generation of an output enable by controller 750 to buffer 730 is suppressed. Merging happens as a bypass for one cycle and restoration in a subsequent cycle if no new data is obtained. Otherwise, if new data is coming, bypass continues until the Tail A test is met.

For the purpose of rotate amount calculation, the feed in of the net valid count already takes care of subsequent calculations. The restoration shows buffer 720 as having 14 bytes and buffer 710 as having 6 bytes. This represents the case of Tail A discussed above in relation to FIG. 6. As such, a calculation is performed as if a simple data stream tail were received, calculated and restored. The rotate amount prediction with respect to 14 bytes is 32−14=18 byte rotation which is the same as a 2 byte rotation (4 bits only). So, for the 6 byte buffer 710, a rotate by 2 puts bytes 0 and 1 in positions 14 and 15, respectively, which are merged with 14 bytes of buffer 720. If this is a true tail, the 16 bytes are passed to buffer 730. The write enables are 20−16, so 4 left over bytes are written to buffer 720.

For the case where 14 bytes in buffer 720 and 6 bytes in buffer 710, the predicted rotate amount is 32−20=12. In this case, the 4 leftover bytes from buffer 720 retain their position and a rotation of 12 puts byte 0 of a new input bytes at position 4, accounting for subsequent concatenation, etc. This process may be repeated ad infinitum.

Data aligner 700 described above may be used to receive unaligned data on line 711 in various byte sizes and aligns the data to achieve a particular byte size, as discussed below in relation to FIG. 8. Data aligner 700 may support data packets that have hole and partial body elements in addition to head elements, body elements, and tail elements.

Rotator 740 operates in a similar one clock cycle look ahead manner discussed above in relation to rotator 440 of FIG. 4 in supporting a partial body element structure. The mapping scheme discussed above in relation to FIG. 6 is realized by predicting and replacing the number of bytes in buffer 720 in a next clock cycle as the net valid count of the current calculation. In the current calculation, the net valid count is the number of bytes in buffer 710 plus the number of bytes in buffer 720. For the case of partial body element support and prediction of the rotate amount for subsequent input, the current net valid byte calculation becomes the buffer 720 byte count. The rotate amount is the primary control and may also serves as a seed for other control signals.

Figure 8:
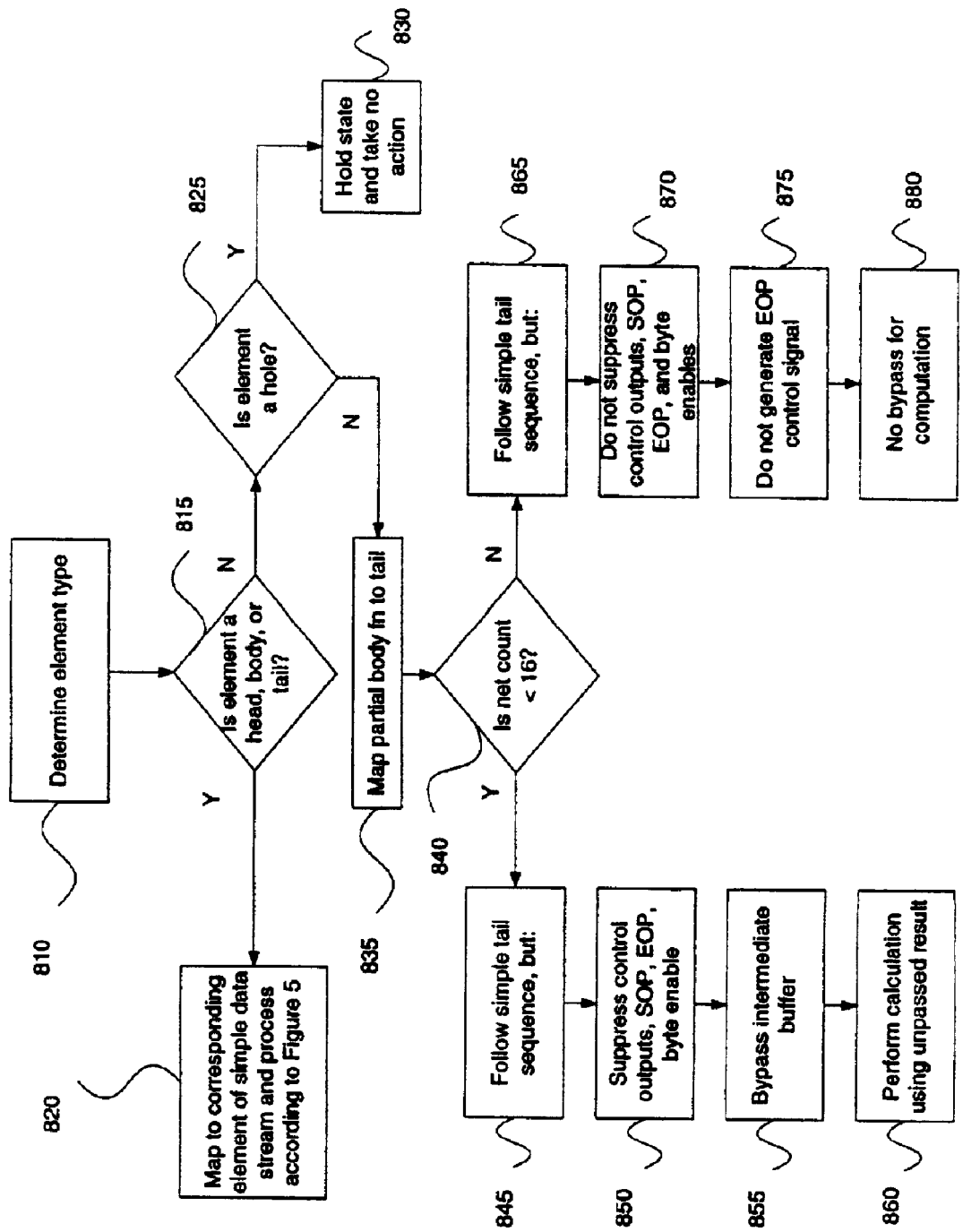
FIG. 8 illustrates another embodiment of a method of data alignment.

FIG. 8 illustrates another embodiment of a method of data alignment for a complex data stream. In one embodiment, a packet element is received and analyzed to determine what type of element it is, step 810. If the element is determined to be a head, body or tail, step 815, then the element is mapped to that of a corresponding element type of a simple data stream and processed as discussed above in relation to FIG. 5, step 820.

If the element is not a head, body or tail, it is analyzed to determine whether it is a hole or a partial body, step 825. If the element is determined to be a hole, then states of the buffers 710, 720, and 730 of data aligner 700 are held and no action is taken, step 830. However, if the element is determined to be a partial body, then the partial body function of the element may be mapped to that of a tail, step 835. When performing this mapping, the partial body element may be categorized into one of two mapped elements, a Tail A and a Tail B, based on the number of bytes (net count) containing data in the partial body and intermediate buffer 720, step 840.

If the net count is less than 16 bytes, then the tail sequence discussed above in relation to FIG. 5 may be followed, step 845 with the following modifications: suppress the control output of data aligner 700, step 850 (This essentially means that the control signals indicating the validity of bytes at locations 1 to 16 are generated in second stage 706 but are suppressed through logic in controller 750 when a Tail A is detected); bypass the intermediate buffer 720, step 855; and perform the next calculation of the net count using the unpassed result in intermediate buffer 720, step 860. In certain implementations, the net count in the current clock cycle may be predicted as the intermediate buffer 730 count in the next clock cycle. Steps 850, 855, and 860 are repeated until the net count exceeds or becomes equal to 16.

For example, if intermediate buffer 720 contains 7 bytes and buffer 710 receives 1 byte, then all 8 bytes are passed to buffer 730. Because there are less than 16 bytes stored in buffer 730, controller 750 suppresses control output 778. In one embodiment, control output 778 is suppressed until the net count equals or exceeds 16 bytes or an EOP signal is received. In an alternative embodiment, another logic configuration and control signal may be used to suppress control output 778 of data aligner 700.

Then, using control signals transmitted by controller 750, the output of buffer 730 is fed back through multiplexers 775, 760 and 770 to be input to buffer 730 on a subsequent clock cycle. In this manner, the output of intermediate buffer 720 is bypassed with contents of buffer 730. The calculation to determine the net count when additional bytes are received at buffer 710 may then be performed using the prediction scheme discussed above in relation to FIG. 7. The steps are repeated until the net count of bytes in buffer 710 and 720 (inclusive of buffer 730 bypass as and when it may occur) equals or exceeds 16 bytes.

If the net count is equal to or greater than 16 bytes, then the tail sequence discussed above in relation to FIG. 5 may be followed, step 865, with the following modifications: the control outputs (inclusive of SOP and byte enables) are not suppressed, step 870; the EOP control signal is not generated, step 875; and the intermediate buffer 720 is not bypassed, step 880, since it is properly updated.

Continuing the previous example, if buffer 720 (inclusive of buffer 730 bypass) stores 8 bytes of data and an additional 8 bytes are received then the 8 bytes are passed to multiplexer 760 along with rotator 760 output. Because the sum equals 16, the concatenated output is passed to multiplexer 770 to be outputted in the next clock cycle. No EOP control signal is generated by controller 750. In this manner, a partial body element that causes a net count at buffers 710 and 720 (inclusive of buffer 730 bypass) to equal or exceed 16 bytes is treated similar to that of a tail element in the simple data stream without the generation of an EOP control signal.

The above method allows for a complex data stream to be mapped onto a relatively simple apparatus with only the addition of multiplexers and combinational logic. This structure eases the burden on the control design in a first stage, that may have a strict timing requirement, and distributes logic between stages rather than over packing the first stage with logic. Such a circuit structure may lead to better timing and a higher frequency of operation.

Figure 9:
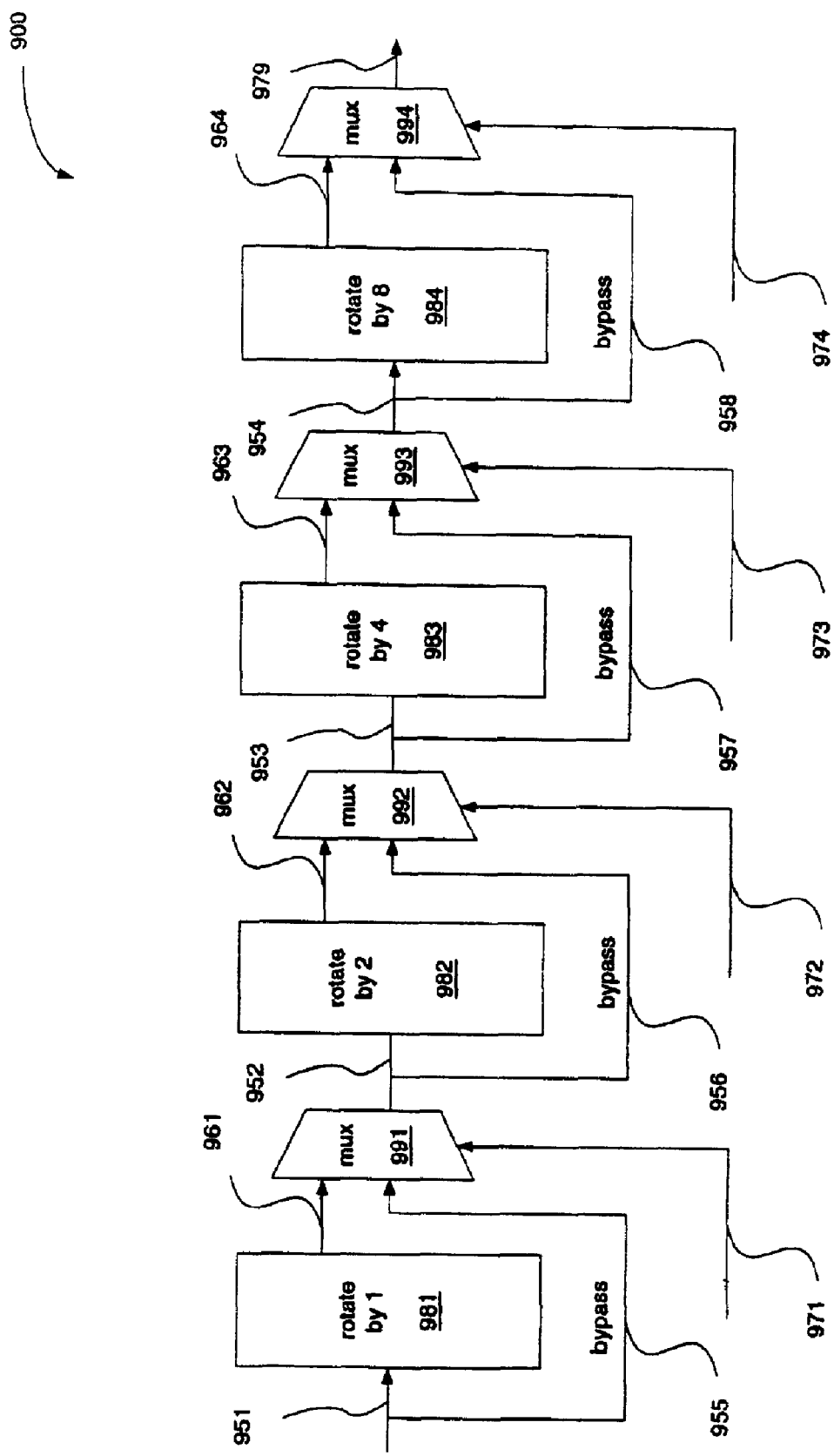
FIG. 9 illustrates one embodiment of a rotator.

FIG. 9 illustrates one embodiment of a rotator. In one embodiment, rotator 900 may be used as rotator 440 of FIG. 4 or rotator 740 of FIG. 7. Rotator 900 represents a 4 stage chain of byte rotation circuitry in which each byte rotation circuit 981–984 is capable of rotating 1, 2, 4, or 8 bytes by themselves. Byte rotation circuitry is known in the art; accordingly, a detailed discussion is not provided.

Each of byte rotation circuitry 981–984 may be bypassed based on a rotate input function. In this configuration, rotator 900 can generate a rotated output 979 from a 16 byte input based on control signals 971 to 974 that indicated an amount of byte rotation from 0 bytes to 15 bytes. FIG. 11 is an exemplary embodiment illustrating outputs of rotator 900 based on inputs and rotate amounts.

Control signals 971–974 are applied as control inputs to multiplexers 991–994, respectively. Control signals 971–974 select between outputs 961–964, respectively, of byte rotation circuitry 981–984, respectively, and the inputs 951–954, respectively, of byte rotation circuitry 981–984. Inputs 951–954 are applied as data inputs 955–958, respectively, to multiplexers 991–994. FIG. 10 illustrates the output 979 based on the data of inputs 951–954 and the rotate amounts. In an alternative embodiment, another type of rotator may be used, for example, a barrel rotator.

The method and apparatus described herein may be used to solve a generic and recurring problem in complex data path designs. The implementation in network protocol related hardware, where a data stream is encoded and decoded for error detection and correction, may lead to a faster and more efficient pipelined design of checkers and generators, thereby, making them more desirable for to higher frequency and higher bandwidth designs.

In an alternative embodiment, the method and apparatus described herein may be used in other types of systems and components that require data alignment, for example, processor load and storage engines where unaligned data in various byte lanes may be aligned. As another example, the method and apparatus may be used in store gathering functions where multiple byte wide stores from internal instructions are mapped as a single store operation on an external bus.

In the foregoing specification, the invention has been described with reference to specific exemplary embodiments thereof. It will, however, be evident that various modifications and changes may be made thereto without departing from the broader spirit and scope of the invention as set forth in the claims. The specification and drawings are, accordingly, to be regarded in an illustrative rather than a restrictive sense.

What is claimed is:

1. A data alignment apparatus, comprising:
   an input for receiving an input temporal series of parallel-formatted input groups of digital data units;
   a data aligner coupled to said input and responsive to said input series for producing an output temporal series of parallel-formatted output groups of said digital data units;
   an output coupled to said data aligner for outputting said output series;
   said data aligner including a buffer coupled to said input for storing data units of a first said input group while a second said input group is received at said input, and a combiner coupled to said buffer and said input for producing one of said output groups by combining in parallel format all of said data units stored in said buffer and selected data units of said second input group;
   a data path coupled to said combiner and said output for permitting said one output group to be transferred to said output without being stored in said buffer;
   wherein said combiner comprises a rotator coupled to said input for rotating the data units of said second input group to position said selected data units of said second input group for said combiner to parallel concatenate said selected data units with all of said data units stored in said buffer to produce said one output group;
   wherein said data aligner includes a controller for determining a rotation amount by which said rotator is to rotate the data units of said second input group, said controller having an output coupled to said rotator for providing to said rotator information indicative of said rotation amount;
   wherein said controller determines said rotation amount based on a data unit storage capacity of said buffer; and
   a further buffer coupled to said input and said combiner for storing said second input group while said data units of said first input group are stored in said first-mentioned buffer, wherein said controller determines said rotation amount based on a sum of respective data unit storage capacities of said buffers.

2. The apparatus of claim 1, wherein said combiner includes a selector having inputs respectively coupled to said input and said buffer, and having an output coupled to said data path.

3. The apparatus of claim 1, wherein each said input group is one of a head element, a body element and a tail element of a data packet.

4. The apparatus of claim 1, wherein each of said data units is a byte.

5. The apparatus of claim 1, wherein said buffer has a maximum data unit storage capacity that is equal to a maximum data unit capacity of the input groups in said input series.

6. The apparatus of claim 5, wherein said maximum data unit storage capacity of said buffer is 16 data units.

7. The apparatus of claim 1, wherein said data path bypasses said buffer.

8. A data alignment method, comprising:
   receiving an input temporal series of parallel-formatted input groups of digital data units;
   in response to the input series, producing an output temporal series of parallel-formatted output groups of said digital data units, including storing data units of a first said input group in a buffer while a second said input group is received;
   said producing step including combining in parallel format all of said data units stored in the buffer and selected data units of said second input group to produce one of said output groups, wherein said combining includes rotating the data units of said second input group to position said selected data units of said second input group for parallel concatenation with all of said data units stored in the buffer, and parallel concatenating said selected data units with all of said data units stored in the buffer to produce said one output group;
   outputting said one output group for further processing without storing said one output group in the buffer;
   storing said second input group in another buffer while said data units of said first input group are stored in said first-mentioned buffer; and
   determining a rotation amount by which said data units of said second input group are rotated based on a sum of respective data unit storage capacities of said buffers.

9. The method of claim 8, wherein said outputting step includes said one output group bypassing the buffer.

10. An apparatus for interfacing a digital data processor to a digital communication network, comprising:
   a first data port that permits exchange of digital data with the data processor;
   a second data port that permits exchange of digital data with the communication network; and
   a data alignment apparatus coupled between said first and second data ports, including an input for receiving an input temporal series of parallel-formatted input groups of digital data units, a data aligner coupled to said input and responsive to said input series for producing an output temporal series of parallel-formatted output groups of said digital data units, and an output coupled to said data aligner for outputting said output series;
   said data aligner including a buffer coupled to said input for storing data units of a first said input group while a second said input group is received at said input, and a combiner coupled to said buffer and said input for producing one of said output groups by combining in parallel format all of said data units stored in said buffer and selected data units of said second input group; and
   said data alignment apparatus including a data path coupled to said combiner and said output for permitting said one output group to be transferred to said output without being stored in said buffer;
   wherein said combiner comprises a rotator coupled to said input for rotating the data units of said second input group to position said selected data units of said second input group for said combiner to parallel concatenate said selected data units with all of said data units stored in said buffer to produce said one output group;
   wherein said data aligner includes a controller for determining a rotation amount by which said rotator is to rotate the data units of said second input group, said controller having an output coupled to said rotator for providing to said rotator information indicative of said rotation amount;
   wherein said controller determines said rotation amount based on a data unit storage capacity of said buffer; and a further buffer coupled to said input and said combiner for storing said second input group while said data units of said first input group are stored in said first-mentioned buffer, wherein said controller determines said rotation amount based on a sum of respective data units storage capacities of said buffers.

11. The apparatus of claim 10, wherein said combiner includes a selector having inputs respectively coupled to said rotator and said buffer, and having an output coupled to said data path.

12. The apparatus of claim 10, provided as one of a SONET card, an Ethernet card and a token ring card.

13. The apparatus of claim 10, wherein said data path bypasses said buffer.

14. A data alignment apparatus, comprising:

an input for receiving an input temporal series of parallel-formatted input groups of digital data units;

a data aligner coupled to said input and responsive to said input series for producing an output temporal series of parallel-formatted output groups of said digital data units;

an output coupled to said data aligner for outputting said output series;

said data aligner comprising:

a buffer coupled to said input for storing data units of a first said input group while a second said input group is received at said input;

a selector having inputs respectively coupled to said input and said buffer, and having an output coupled to a data path, said data path coupled to said output for permitting said one output group to be transferred to said output without being stored in said buffer;

a rotator coupled to said input for rotating the data units of said second input group to position said selected data units of said second input group to parallel concatenate said selected data units with all of said data units stored in said buffer to produce said one output group; and a controller for determining a rotation amount by which said rotator is to rotate the data units of said second input group, said controller having an output coupled to said rotator for providing to said rotator information indicative of said rotation amount; and a further buffer coupled to said input and said rotator for storing said second input group while said data units of said first input group are stored in said first-mentioned buffer, wherein said controller determines said rotation amount based on a sum of respective data unit storage capacities of said buffers.

* * * * *